(12) United States Patent
Phillips et al.

(10) Patent No.: US 7,909,726 B2
(45) Date of Patent: Mar. 22, 2011

(54) MULTI-SPEED TRANSMISSION

(75) Inventors: Andrew W. Phillips, Saline, MI (US);
Jeffrey Kenneth Baran, West Bloomfield, MI (US); Clinton E. Carey, Monroe, MI (US); Scott H. Wittkopp, Ypsilanti, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 587 days.

(21) Appl. No.: 11/970,159

(22) Filed: Jan. 7, 2008

(65) Prior Publication Data

US 2009/0011891 A1 Jan. 8, 2009

Related U.S. Application Data

(60) Provisional application No. 60/900,613, filed on Feb. 8, 2007.

(51) Int. Cl.
*F16H 3/44* (2006.01)
(52) U.S. Cl. ........................ 475/282; 475/330
(58) Field of Classification Search .................. 475/269, 475/271, 275–290, 330
See application file for complete search history.

(56) References Cited

U.S. PATENT DOCUMENTS

| | | | |
|---|---|---|---|
| 6,176,803 B1 * | 1/2001 | Meyer et al. .................. | 475/286 |
| 6,342,026 B1 | 1/2002 | Takagi | |
| 6,547,688 B2 | 4/2003 | Takagi | |
| 6,736,751 B1 | 5/2004 | Usoro | |
| 6,743,139 B1 | 6/2004 | Usoro | |
| 6,743,140 B1 | 6/2004 | Lee | |
| 6,743,142 B1 | 6/2004 | Lee | |
| 6,743,143 B1 | 6/2004 | Usoro | |
| 6,743,144 B1 | 6/2004 | Lee | |
| 6,746,357 B1 | 6/2004 | Usoro | |
| 6,752,736 B1 | 6/2004 | Lee | |
| 6,755,765 B2 | 6/2004 | Usoro | |
| 6,758,784 B2 | 7/2004 | Lee | |
| 6,758,787 B2 | 7/2004 | Usoro | |
| 6,764,424 B1 | 7/2004 | Usoro | |
| 6,764,425 B2 | 7/2004 | Lee | |
| 6,764,426 B2 | 7/2004 | Usoro et al. | |
| 6,767,307 B1 | 7/2004 | Lee | |
| 6,811,512 B2 | 11/2004 | Usoro | |
| 6,837,823 B2 | 1/2005 | Lee | |
| 6,852,059 B2 | 2/2005 | Lee | |
| 6,960,149 B2 | 11/2005 | Ziemer | |
| 7,011,597 B2 | 3/2006 | Haka | |
| 7,014,589 B2 | 3/2006 | Stevenson | |
| 7,128,683 B2 | 10/2006 | Oguri | |
| 7,163,484 B2 | 1/2007 | Klemen | |
| 7,364,527 B2 * | 4/2008 | Klemen ......................... | 475/290 |
| 7,686,731 B2 * | 3/2010 | Raghavan ...................... | 475/276 |
| 7,691,024 B2 * | 4/2010 | Phillips et al. ................. | 475/276 |
| 7,722,496 B2 * | 5/2010 | Phillips et al. ................. | 475/276 |
| 7,753,820 B2 * | 7/2010 | Phillips et al. ................. | 475/276 |
| 2006/0019791 A1 * | 1/2006 | Baldwin ......................... | 475/275 |
| 2006/0166779 A1 * | 7/2006 | Klemen ......................... | 475/280 |
| 2006/0270514 A1 | 11/2006 | Oguri | |
| 2006/0270516 A1 * | 11/2006 | Klemen ......................... | 475/280 |
| 2007/0207891 A1 * | 9/2007 | Gumpoltsberger ............ | 475/280 |
| 2009/0197733 A1 * | 8/2009 | Phillips et al. ................. | 475/276 |
| 2010/0041509 A1 * | 2/2010 | Gumpoltsberger et al. .. | 475/275 |

* cited by examiner

*Primary Examiner* — David D Le
*Assistant Examiner* — Derek D Knight

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices may include clutches and brakes.

16 Claims, 2 Drawing Sheets

| GEAR STATE | GEAR RATIO | RATIO STEP | CLUTCHING ELEMENTS | | | | | |
|---|---|---|---|---|---|---|---|---|
| | | | 92 | 86 | 80 | 84 | 82 | 90 |
| REV | -3.260 | | X | | | | X | X |
| N | | -0.71 | O | | | | | O |
| 1ST | 4.600 | | X | | | X | | O |
| 2ND | 3.116 | 1.48 | X | X | | | | X |
| 3RD | 2.164 | 1.44 | X | | X | | | X |
| 4TH | 1.557 | 1.39 | | X | X | | | X |
| 5TH | 1.291 | 1.21 | | | X | X | | X |
| 6TH | 1.110 | 1.16 | | | X | | X | X |
| 7TH | 1.000 | 1.11 | | | X | X | X | |
| 8TH | 0.846 | 1.18 | | | | X | X | X |
| 9TH | 0.677 | 1.25 | | X | | | X | X |

X = ENGAGED
O = ON, NOT CARRYING TORQUE

FIG. 3

| GEAR STATE | GEAR RATIO | RATIO STEP | CLUTCHING ELEMENTS | | | | | |
|---|---|---|---|---|---|---|---|---|
| | | | 92 | 86 | 80 | 84 | 90 | 82 |
| REV | -3.260 | | X | | | | X | X |
| N | | -0.71 | O | | | | | |
| 1ST | 4.600 | | X | | | X | X | |
| 2ND | 3.116 | 1.48 | X | X | | | X | |
| 3RD | 2.544 | 1.22 | X | X | X | | | |
| 4TH | 2.164 | 1.18 | X | | X | | X | |
| 5TH | 1.557 | 1.39 | | X | X | | X | |
| 6TH | 1.291 | 1.21 | | | X | X | X | |
| 7TH | 1.110 | 1.16 | | | X | | X | X |
| 8TH | 1.000 | 1.11 | | | X | X | | X |
| 9TH | 0.846 | 1.18 | | | | X | X | X |
| 10TH | 0.677 | 1.25 | | X | | | X | X |

X = ENGAGED
O = ON, NOT CARRYING TORQUE

FIG. 4

MULTI-SPEED TRANSMISSION

CROSS-REFERENCE TO RELATED APPLICATIONS

This application claims the benefit of U.S. Provisional Application Ser. No. 60/900,613 filed on Feb. 8, 2007. The disclosure of the above application is incorporated herein by reference.

TECHNICAL FIELD

The invention relates generally to a multiple speed transmission having a plurality of planetary gear sets and a plurality of torque transmitting devices and more particularly to a transmission having nine or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices may include clutches and brakes.

One embodiment of the present invention includes an input member, an output member, first, second, third and fourth planetary gear sets each having first, second and third members, a first interconnecting member continuously interconnecting the third member of the first planetary gear set with the first member of the second planetary gear set, a second interconnecting member continuously interconnecting the third member of the second planetary gear set with the second member of the third planetary gear set, a third interconnecting member continuously interconnecting the third member of the third planetary gear set with the second member of the fourth planetary gear set, and a fourth interconnecting member continuously interconnecting the first member of the third planetary gear set with the first member of the fourth planetary gear set. Six torque transmitting mechanisms are selectively engageable to interconnect one of the first, second, and third members with another of the first, second, third members, and a stationary element. The torque transmitting mechanisms are selectively engageable in combinations of at least three to establish at least nine forward speed ratios and at least one reverse speed ratio between the input member and the output member.

In one aspect of the present invention, a first of the six torque transmitting mechanisms is selectively engageable to interconnect the second member of the first planetary gear set with the second member of the second planetary gear set.

In another aspect of the present invention, a second of the six torque transmitting mechanisms is selectively engageable to interconnect the second member of the second planetary gear set with the third member of the fourth planetary gear set.

In yet another aspect of the present invention, a third of the six torque transmitting mechanisms is selectively engageable to interconnect at least one of the input member and the second member of the first planetary gear set with at least one of the first member of the third planetary gear set and the first member of the fourth planetary gear set.

In yet another aspect of the present invention, a fourth of the six torque transmitting mechanisms is selectively engageable to interconnect at least one of the third member of the first planetary gear set and the first member of the second planetary gear set with at least one of the first member of the third planetary gear set and the first member of the fourth planetary gear set.

In yet another aspect of the present invention, a fifth of the six torque transmitting mechanisms is selectively engageable to interconnect the first member of the first planetary gear set with the stationary element.

In yet another aspect of the present invention, a sixth of the six torque transmitting mechanisms is selectively engageable to interconnect the third member of the fourth planetary gear set with the stationary element.

In yet another aspect of the present invention, the first members are sun gears, the second members are carrier members, and the third members are ring gears.

In yet another aspect of the present invention, the input member is continuously interconnected with the second member of the first planetary gear set and wherein the output member is continuously interconnected with the second member of the fourth planetary gear set.

In yet another aspect of the present invention, two of the torque transmitting mechanisms are brakes and four of the torque transmitting mechanisms are clutches.

In yet another aspect of the present invention, the stationary element is a transmission housing.

Another embodiment of the transmission includes an input member, an output member, first, second, third and fourth planetary gear sets each having a sun gear, a carrier member, and a ring gear, wherein the input member is continuously interconnected with the carrier member of the first planetary gear set and wherein the output member is continuously interconnected with the carrier member of the fourth planetary gear set, a first interconnecting member continuously interconnecting the ring gear of the first planetary gear set with the sun gear of the second planetary gear set, a second interconnecting member continuously interconnecting the ring gear of the second planetary gear set with the carrier member of the third planetary gear set, a third interconnecting member continuously interconnecting the ring gear of the third planetary gear set with the carrier member of the fourth planetary gear set, and a fourth interconnecting member continuously interconnecting the sun gear of the third planetary gear set with the sun gear of the fourth planetary gear set. A first torque transmitting mechanism is selectively engageable to interconnect the carrier member of the first planetary gear set with the carrier member of the second planetary gear set, a second torque transmitting mechanism is selectively engageable to interconnect the carrier member of the second planetary gear set with the ring gear of the fourth planetary gear set, a third torque transmitting mechanism is selectively engageable to interconnect at least one of the input member and the carrier member of the first planetary gear set with at least one of the sun gear of the third planetary gear set and the sun gear of the fourth planetary gear set, a fourth torque transmitting mechanism is selectively engageable to interconnect at least one of the ring gear of the first planetary gear set and the sun gear of the second planetary gear set with at least one of the sun gear of the third planetary gear set and the sun gear of the fourth planetary gear set, a fifth torque transmitting mechanism is selectively engageable to interconnect the sun gear of the first planetary gear set with a stationary element, and a sixth torque transmitting mechanism is selectively engageable to interconnect the ring gear of the fourth planetary gear set with the stationary element. The torque transmitting mechanisms are selectively engageable in combinations of at least three to establish at least nine forward speed ratios and at least one reverse speed ratio between the input member and the output member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2; and FIG. 4 is an alternate truth table presenting the state of engagement of the various torque transmitting elements in each of the available forward and reverse speeds or gear ratios of the transmission illustrated in FIGS. 1 and 2.

DESCRIPTION

At the outset, it should be appreciated that the automatic transmission of the present invention has an arrangement of permanent mechanical connections between the elements of the four planetary gear sets in common. These mechanical connections generically link or relate transmission embodiments. A first component or element of a first planetary gear set is permanently coupled to a first component or element of a second planetary gear set. A third component or element of the second planetary gear set is permanently coupled to a second component or element of a third planetary gear set. A first component or element of the third planetary gear set is permanently coupled to a first component or element of a fourth planetary gear set. Finally, a third component or element of the third planetary gear set is permanently coupled to a second component or element of the fourth planetary gear set.

Figure 1:
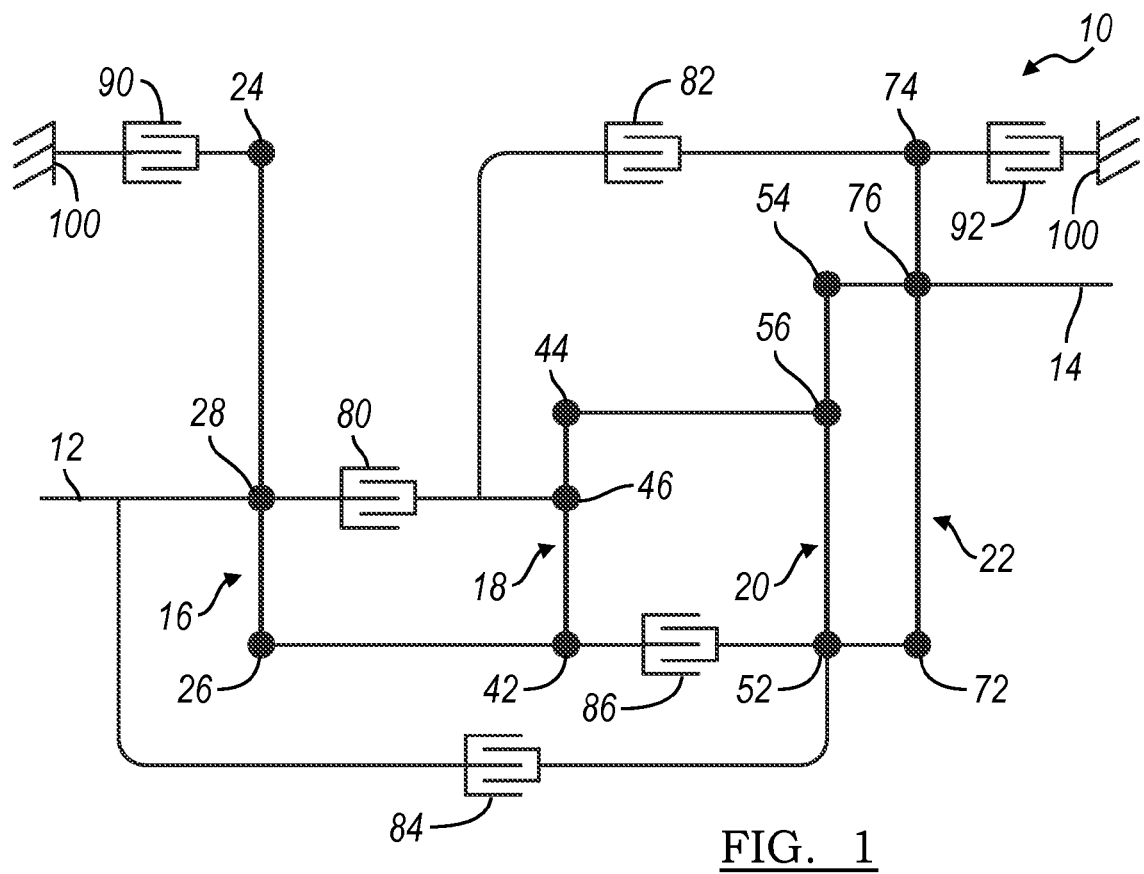
FIG. 1 is a lever diagram of an embodiment of a multiple speed transmission according to the present invention.

Referring now to FIG. 1, an embodiment of a multiple speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, an output shaft or member 14, a first planetary gear set 16 having three nodes: a first node 24, a second node 26 and a third node 28, a second planetary gear set 18 having three nodes: a first node 42, a second node 44 and a third node 46, a third planetary gear set 20 having three nodes: a first node 52, a second node 54 and a third node 56, and a fourth planetary gear set 22 having three nodes: a first node 72, a second node 74 and a third node 76.

The input member 12 is coupled to the third node 28 of the first planetary gear set 16. The output 14 is coupled to the third node 76 of the fourth planetary gear set 22. The second node 26 of the first planetary gear set 16 is coupled to the first node 42 of the second planetary gear set 18. The second node 44 of the second planetary gear set 18 is coupled to the third node 56 of the third planetary gear set 20. The first node 52 of the third planetary gear set 20 is coupled to the first node 72 of the fourth planetary gear set 22. The second node 54 of the third planetary gear set 20 is coupled to the third node 76 of the fourth planetary gear set 22.

A first clutch 80 selectively connects the third node 28 of the first planetary gear set 16 to the third node 46 of the second planetary gear set 18. A second clutch 82 selectively connects the third node 46 of the second planetary gear set 18 to the second node 74 of the fourth planetary gear set 22. A third clutch 84 selectively connects the input member 12 to the first node 52 of the third planetary gear set 20. A fourth clutch 86 selectively connects the first node 42 of the second planetary gear set 18 to the first node 52 of the third planetary gear set 20. A first brake 90 selectively connects the first node 24 of the first planetary gear set 16 to a ground, stationary element, or a transmission housing 100. A second brake 92 selectively connects the second node 74 of the fourth planetary gear set 22 to a ground, stationary element, or the transmission housing 100.

Figure 2:
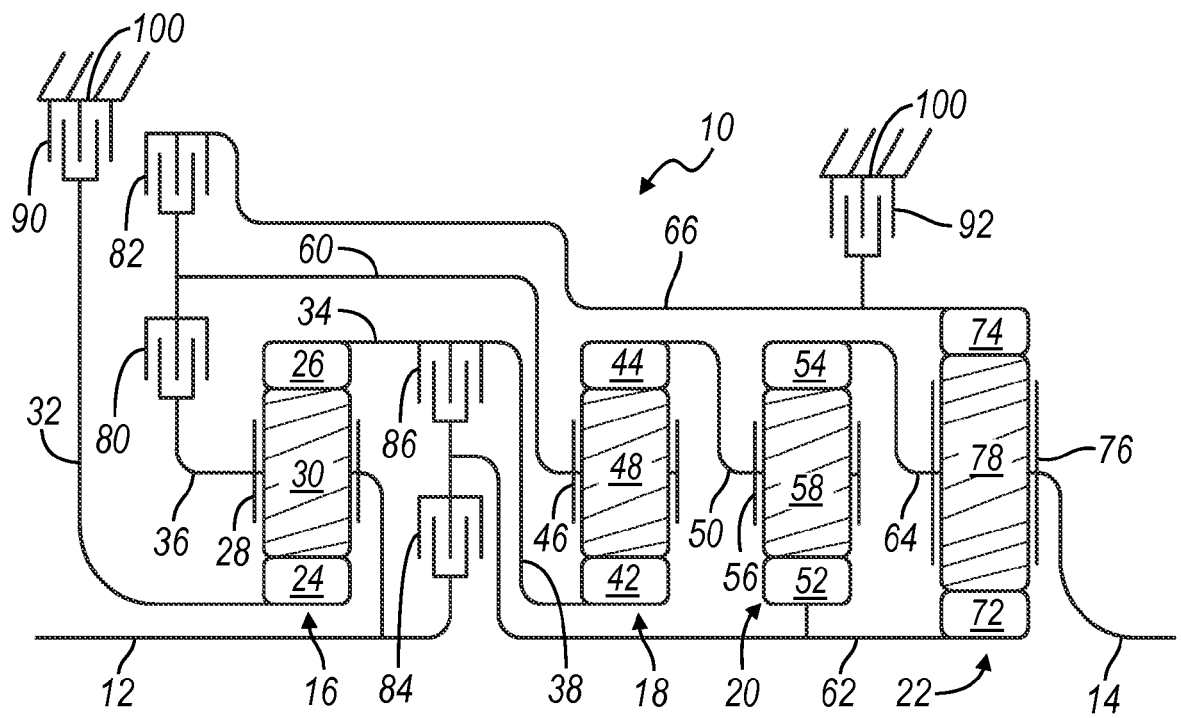
FIG. 2 is a diagrammatic view of an embodiment of a multiple speed transmission according to the present invention.

Referring now to FIG. 2, a stick diagram presents a schematic layout of the embodiment of the multiple speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gears, ring gears, planet gears and planet gear carriers.

For example, the first planetary gear set 16 includes a sun gear member 24, a ring gear member 26 and a carrier member 28 that rotatably supports a set of pinion gears 30 (only one shown). Each of the pinion gears 30 are configured to intermesh with both sun gear member 24 and ring gear member 26. Sun gear member 24 is connected for common rotation with a first interconnecting shaft or member 32. Ring gear member 26 is connected for common rotation with a second interconnecting shaft or member 34. Carrier member 28 is connected for common rotation with a third interconnecting shaft or member 36 and with input shaft 12.

The second planetary gear set 18 includes a sun gear member 42, a ring gear member 44 and a carrier member 46 that rotatably supports a set of pinion gears 48. Each of the pinion gears 48 are configured to intermesh with both sun gear member 42 and ring gear member 44. Sun gear member 42 is connected for common rotation with a fourth interconnecting shaft or member 38. Ring gear member 44 is connected for common rotation with a fifth interconnecting shaft or member 50. Carrier member 46 is connected for common rotation with a sixth interconnecting shaft or member 60.

The third planetary gear set 20 includes a sun gear member 52, a ring gear member 54 and a carrier member 56 that rotatably supports a set of pinion gears 58. Each of the pinion gears 58 are configured to intermesh with both sun gear member 52 and ring gear member 54. Sun gear member 52 is connected for common rotation with a seventh interconnecting shaft or member 62. Ring gear member 54 is connected for common rotation with an eighth interconnecting shaft or member 64. Carrier member 56 is connected for common rotation with fifth interconnecting member 50.

The fourth planetary gear set 22 includes a sun gear member 72, a ring gear member 74 and a carrier member 76 that rotatably supports a set of pinion gears 78. Each of the pinion gears 78 are configured to intermesh with both sun gear member 72 and ring gear member 74. Sun gear member 72 is connected for common rotation with seventh interconnecting member 62. Ring gear member 74 is connected for common rotation with a ninth interconnecting shaft or member 66. Carrier member 76 is connected for common rotation with eighth interconnecting member 64 and with output shaft 14.

The input shaft 12 is continuously connected to an engine (not shown) or to a turbine of a torque converter (not shown). The output shaft 14 is continuously connected with the final drive unit (not shown).

The transmission 10 includes a variety of torque-transmitting mechanisms or devices including a first clutch 80, a second clutch 82, a third clutch 84, a fourth clutch 86, a first brake 90 and a second brake 92. First clutch 80 is selectively engagable to connect third interconnecting member 36 to sixth interconnecting member 60. Second clutch 82 is selectively engagable to connect sixth interconnecting member 60 to ninth interconnecting member 66. Third clutch 84 is selectively engagable to connect input shaft 12 to seventh interconnecting member 62. Fourth clutch 86 is selectively engagable to connect second and fourth interconnecting members 34, 38 to seventh interconnecting member 62. First brake 90 is selectively engagable to connect first interconnecting member 32 to transmission housing 100 to restrict rotation of first interconnecting member 32 and sun gear 24 relative to housing 100. Second brake 92 is selectively engagable to connect ninth interconnecting member 66 to housing 100 to restrict rotation of ninth interconnecting member 66 and ring gear 74 relative to housing 100.

Referring now to FIGS. 2 and 3, the operation of the embodiment of the multiple speed transmission 10 will be described. It will be appreciated that the transmission 10 is capable of transmitting torque from the input shaft or member 12 to the output shaft or member 14 in at least nine forward speed or torque ratios and at least one reverse speed or torque ratio. Each forward and reverse speed or torque ratio is attained by engagement of one or more of the torque-transmitting mechanisms (i.e. first clutch 80, second clutch 82, third clutch 84, fourth clutch 86, first brake 32, and second brake 34), as will be explained below. FIG. 3 is a truth table presenting the various combinations of torque-transmitting mechanisms or elements that are activated or engaged to achieve the various gear states. Actual numerical gear ratios and gear steps of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 90, the second brake 92, and the second clutch 82 are engaged or activated. First brake 90 connects first interconnecting member 32 to transmission housing 100 to restrict rotation of first interconnecting member 32 and sun gear 24 relative to housing 100. Second brake 92 connects ninth interconnecting member 66 to housing 100 to restrict rotation of ninth interconnecting member 66 and ring gear 74 relative to housing 100. Second clutch 82 connects sixth interconnecting member 60 to ninth interconnecting member 66. Likewise, the nine forward ratios are achieved through different combinations of clutch and brake engagement, as shown in FIG. 3.

Referring now to FIG. 4, an alternate truth table is presented for the operation of the embodiment of the multiple speed transmission 10. It will be appreciated that the transmission 10 is capable of transmitting torque from the input shaft or member 12 to the output shaft or member 14 in at least ten forward speed or torque ratios and at least one reverse speed or torque ratio. Each forward and reverse speed or torque ratio is attained by engagement of one or more of the torque-transmitting mechanisms (i.e. first clutch 80, second clutch 82, third clutch 84, fourth clutch 86, first brake 32, and second brake 34), as was described above. Actual numerical gear ratios and gear steps of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

It will be appreciated that the foregoing explanation of operation and gear states of the multiple speed transmission 10 assumes, first of all, that all the clutches and the brakes not specifically referenced in a given gear state are inactive or disengaged and, second of all, that during gear shifts, i.e., changes of gear state, between at least adjacent gear states, a clutch or brake engaged or activated in both gear states will remain engaged or activated. Additionally, the present invention contemplates that downshifts follow essentially the reverse sequence of the corresponding upshift (as described above), and several power-on skip-shifts are possible (e.g. from 1st to 3rd).

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member;
an output member;
first, second, third and fourth planetary gear sets each having first, second and third members;
a first interconnecting member continuously interconnecting the third member of the first planetary gear set with the first member of the second planetary gear set;
a second interconnecting member continuously interconnecting the third member of the second planetary gear set with the second member of the third planetary gear set;
a third interconnecting member continuously interconnecting the third member of the third planetary gear set with the second member of the fourth planetary gear set;
a fourth interconnecting member continuously interconnecting the first member of the third planetary gear set with the first member of the fourth planetary gear set; and
six torque transmitting mechanisms selectively engageable to interconnect one of the first, second, and third members with another of the first, second, third members, and a stationary element, and
wherein the torque transmitting mechanisms are selectively engageable in combinations of at least three to establish at least nine forward speed ratios and at least one reverse speed ratio between the input member and the output member.

2. The transmission of claim 1 wherein a first of the six torque transmitting mechanisms is selectively engageable to interconnect the second member of the first planetary gear set with the second member of the second planetary gear set.

3. The transmission of claim 2 wherein a second of the six torque transmitting mechanisms is selectively engageable to interconnect the second member of the second planetary gear set with the third member of the fourth planetary gear set.

4. The transmission of claim 3 wherein a third of the six torque transmitting mechanisms is selectively engageable to interconnect at least one of the input member and the second member of the first planetary gear set with at least one of the first member of the third planetary gear set and the first member of the fourth planetary gear set.

5. The transmission of claim 4 wherein a fourth of the six torque transmitting mechanisms is selectively engageable to interconnect at least one of the third member of the first planetary gear set and the first member of the second planetary gear set with at least one of the first member of the third planetary gear set and the first member of the fourth planetary gear set.

6. The transmission of claim 5 wherein a fifth of the six torque transmitting mechanisms is selectively engageable to interconnect the first member of the first planetary gear set with the stationary element.

7. The transmission of claim 6 wherein a sixth of the six torque transmitting mechanisms is selectively engageable to interconnect the third member of the fourth planetary gear set with the stationary element.

8. The transmission of claim 1 wherein the first members are sun gears, the second members are carrier members, and the third members are ring gears.

9. The transmission of claim 1 wherein the input member is continuously interconnected with the second member of the first planetary gear set and wherein the output member is continuously interconnected with the second member of the fourth planetary gear set.

10. The transmission of claim 1 wherein two of the torque transmitting mechanisms are brakes and four of the torque transmitting mechanisms are clutches.

11. The transmission of claim 1 wherein the stationary element is a transmission housing.

12. A transmission comprising:
an input member;
an output member;
first, second, third and fourth planetary gear sets each having first, second and third members, wherein the input member is continuously interconnected with the second member of the first planetary gear set and wherein the output member is continuously interconnected with the second member of the fourth planetary gear set;
a first interconnecting member continuously interconnecting the third member of the first planetary gear set with the first member of the second planetary gear set;
a second interconnecting member continuously interconnecting the third member of the second planetary gear set with the second member of the third planetary gear set;
a third interconnecting member continuously interconnecting the third member of the third planetary gear set with the second member of the fourth planetary gear set;
a fourth interconnecting member continuously interconnecting the first member of the third planetary gear set with the first member of the fourth planetary gear set;
a first torque transmitting mechanism selectively engageable to interconnect the second member of the first planetary gear set with the second member of the second planetary gear set;
a second torque transmitting mechanism selectively engageable to interconnect the second member of the second planetary gear set with the third member of the fourth planetary gear set;
a third torque transmitting mechanism selectively engageable to interconnect at least one of the input member and the second member of the first planetary gear set with at least one of the first member of the third planetary gear set and the first member of the fourth planetary gear set;
a fourth torque transmitting mechanism selectively engageable to interconnect at least one of the third member of the first planetary gear set and the first member of the second planetary gear set with at least one of the first member of the third planetary gear set and the first member of the fourth planetary gear set;
a fifth torque transmitting mechanism selectively engageable to interconnect the first member of the first planetary gear set with a stationary element; and
a sixth torque transmitting mechanism selectively engageable to interconnect the third member of the fourth planetary gear set with the stationary element, and
wherein the torque transmitting mechanisms are selectively engageable in combinations of at least three to establish at least nine forward speed ratios and at least one reverse speed ratio between the input member and the output member.

13. The transmission of claim 12 wherein the first members are sun gears, the second members are carrier members, and the third members are ring gears.

14. The transmission of claim 13 wherein the stationary element is a transmission housing.

15. A transmission comprising:
an input member;
an output member;
first, second, third and fourth planetary gear sets each having a sun gear, a carrier member, and a ring gear, wherein the input member is continuously interconnected with the carrier member of the first planetary gear set and wherein the output member is continuously interconnected with the carrier member of the fourth planetary gear set;

a first interconnecting member continuously interconnecting the ring gear of the first planetary gear set with the sun gear of the second planetary gear set;

a second interconnecting member continuously interconnecting the ring gear of the second planetary gear set with the carrier member of the third planetary gear set;

a third interconnecting member continuously interconnecting the ring gear of the third planetary gear set with the carrier member of the fourth planetary gear set;

a fourth interconnecting member continuously interconnecting the sun gear of the third planetary gear set with the sun gear of the fourth planetary gear set;

a first torque transmitting mechanism selectively engageable to interconnect the carrier member of the first planetary gear set with the carrier member of the second planetary gear set;

a second torque transmitting mechanism selectively engageable to interconnect the carrier member of the second planetary gear set with the ring gear of the fourth planetary gear set;

a third torque transmitting mechanism selectively engageable to interconnect at least one of the input member and the carrier member of the first planetary gear set with at least one of the sun gear of the third planetary gear set and the sun gear of the fourth planetary gear set;

a fourth torque transmitting mechanism selectively engageable to interconnect at least one of the ring gear of the first planetary gear set and the sun gear of the second planetary gear set with at least one of the sun gear of the third planetary gear set and the sun gear of the fourth planetary gear set;

a fifth torque transmitting mechanism selectively engageable to interconnect the sun gear of the first planetary gear set with a stationary element; and a sixth torque transmitting mechanism selectively engageable to interconnect the ring gear of the fourth planetary gear set with the stationary element, and wherein the torque transmitting mechanisms are selectively engageable in combinations of at least three to establish at least nine forward speed ratios and at least one reverse speed ratio between the input member and the output member.

16. The transmission of claim 15 wherein the stationary element is a transmission housing.

* * * * *